(12) United States Patent
Hwang

(10) Patent No.: US 9,863,528 B2
(45) Date of Patent: Jan. 9, 2018

(54) HYDRAULIC PRESSURE SUPPLY SYSTEM OF AUTOMATIC TRANSMISSION

(71) Applicant: Hyundai Motor Company, Seoul (KR)

(72) Inventor: Jin Young Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 15/178,899

(22) Filed: Jun. 10, 2016

(65) Prior Publication Data

US 2017/0167598 A1    Jun. 15, 2017

(30) Foreign Application Priority Data

Dec. 10, 2015   (KR) .................. 10-2015-0176129

(51) Int. Cl.
*F16H 61/00* (2006.01)
*F16H 61/02* (2006.01)

(52) U.S. Cl.
CPC ..... *F16H 61/0031* (2013.01); *F16H 61/0267* (2013.01)

(58) Field of Classification Search
CPC .................. F16H 61/0031; F16H 61/0267
See application file for complete search history.

(56) References Cited

U.S. PATENT DOCUMENTS

| 7,163,481 B2 | 1/2007 | Takagi et al. |
| 8,141,355 B2* | 3/2012 | Stehr .................. F16H 61/0031 60/430 |
| 2010/0228452 A1* | 9/2010 | Hosoya .............. F16H 61/0031 701/51 |
| 2015/0132163 A1* | 5/2015 | Wright .................. B60K 6/547 417/420 |

FOREIGN PATENT DOCUMENTS

| JP | 2010-209979 A | 9/2010 |
| JP | 4754962 B2 | 8/2011 |
| JP | 5012321 B2 | 8/2012 |
| KR | 10-1338455 B1 | 12/2013 |

* cited by examiner

*Primary Examiner* — Sherry L Estremsky
(74) *Attorney, Agent, or Firm* — Morgan, Lewis & Bockius LLP

(57) ABSTRACT

A hydraulic pressure supply system of an automatic transmission may include a mechanical oil pump driven by an engine to supply the oil stored in the oil pan to a first supply path fluidly-connected to the mechanical oil pump, a switch valve fluidly-connected to the first supply path and selectively supplying oil supplied from the first supply path to the transmission unit through a second supply path fluidly-connected to the switch valve and the transmission unit, a solenoid valve actuator engaged to the switch valve, and an electrical oil pump fluidly connected to the oil pan to pump the oil stored in the oil pan as a second high-pressure hydraulic pressure and supply the oil in the pan to a third supply path fluidly-connected with the second supply path, wherein the first and second hydraulic pressures may be applied to the transmission unit through three operation modes.

5 Claims, 4 Drawing Sheets

HYDRAULIC PRESSURE SUPPLY SYSTEM OF AUTOMATIC TRANSMISSION

CROSS-REFERENCE TO RELATED APPLICATION

The present application claims priority to and the benefit of Korean Patent Application No. 10-2015-0176129 filed on Dec. 10, 2015, the entire contents of which is incorporated herein for all purposes by this reference.

BACKGROUND OF THE INVENTION

Field of the Invention

The present invention relates to a hydraulic pressure supply system for an automatic transmission of a vehicle. More particularly, the present invention relates to a hydraulic pressure supply system for an automatic transmission of a vehicle for maximizing reduction of fuel consumption and minimizing capacity of a mechanical oil pump as an auxiliary function of an electric pump.

Description of Related Art

In recent years, as higher oil prices worldwide and exhaust gas discharge regulations have become more restrictive, car makers have devoted all their power to technological development which is environmentally friendly and can improve fuel efficiency.

Fuel efficiency in an automatic transmission may be improved by improving power transmission efficiency, and the power transmission efficiency can be improved by minimizing unnecessary power consumption in the oil pump.

However, in a conventional system, hydraulic pressure pumped by the mechanical pump driven by engine power is controlled by a pressure control valve and then supplied to each transmission unit, and accordingly, the amount of oil cannot be controlled, thereby causing unnecessary power loss.

In particular, generation of unnecessary hydraulic pressure at a high RPM area causes power loss, thereby reducing fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle, which can maximize fuel efficiency by realizing a plurality of pump operation modes and can minimize capacity of a mechanic oil pump as an auxiliary function of an electrical pump.

In an aspect of the present invention, a hydraulic pressure supply system of an automatic transmission for a vehicle, generating high-pressure hydraulic pressure from oil stored in an oil pan and supplying the hydraulic pressure to a transmission unit, may include a mechanical oil pump driven by an engine to pump the oil stored in the oil pan as a first high-pressure hydraulic pressure and to supply the oil stored in the oil pan to a first supply path fluidly-connected to the mechanical oil pump, a switch valve fluidly-connected to the first supply path and selectively supplying oil supplied from the first supply path to the transmission unit through a second supply path fluidly-connected to the switch valve and the transmission unit, a solenoid valve actuator engaged to the switch valve and configured to be turned on/off to control the switch valve, and an electrical oil pump fluidly connected to the oil pan and engaged to and driven by an electrical motor to pump the oil stored in the oil pan as a second high-pressure hydraulic pressure and supply the oil in the pan to a third supply path fluidly-connected with the second supply path, wherein the first and second hydraulic pressures are applied to the transmission unit through three operation modes.

A recirculation path is fluidly-connected to the switch valve, the oil pan, the mechanical oil pump, and the electrical oil pump.

The switch valve is provided as a spool valve, and is fluidly-connected to the first supply path of the mechanical oil pump and selectively supplies oil supplied to the first supply path to the second supply path and the recirculation path depending on a turn-on or turn-off state of the solenoid valve actuator.

A check valve preventing back flow is provided on the third supply path.

The three operation modes may include a first operation mode in which only the first hydraulic pressure of the mechanical oil pump is applied to the transmission unit, a second operation mode in which only the second hydraulic pressure of the electrical oil pump is applied to the transmission unit, and a third operation mode in which the first and second hydraulic pressures of the mechanical oil pump and the electrical oil pump are supplied to the transmission unit.

According to the exemplary embodiment of the present invention, three operation modes are realized depending on driving conditions to thereby maximize fuel efficiency.

In addition, as an auxiliary function of the electrical hydraulic pump, capacity of the mechanical oil pump can be minimized, thereby reducing a volumetric rate and heaviness of the vehicle.

Further, stability of hydraulic pressure can be acquired by optimum-driving only using the electrical hydraulic pump in the main driving area.

Further, since a fail-safe function is provided, system reliability can be improved even through the electrical hydraulic pump malfunctions.

The methods and apparatuses of the present invention may have other features and advantages which will be apparent from or are set forth in more detail in the accompanying drawings, which are incorporated herein, and the following Detailed Description, which together serve to explain certain principles of the present invention.

Figure 1:
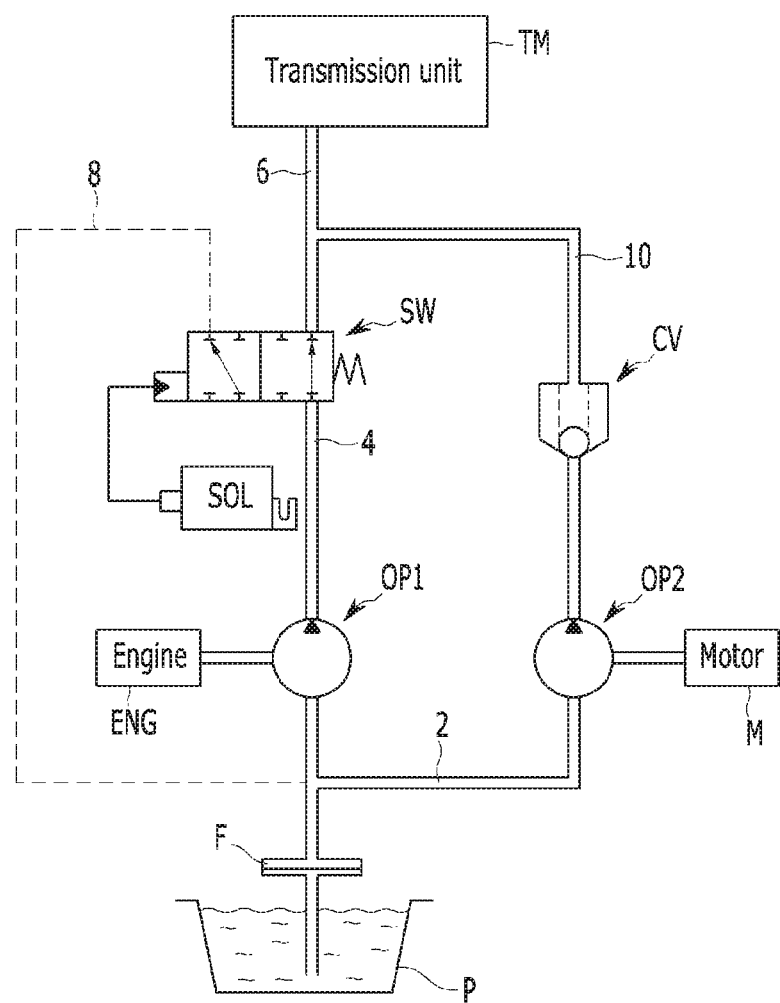
FIG. 1 is a schematic view of a hydraulic pressure supply system according to an aspect of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be may include d within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description are omitted in order to clearly describe the present invention, and like reference numerals designate like elements throughout the specification.

In the following description, dividing names of components into first, second, and the like is to divide the names because the names of the components are the same as each other and an order thereof is not particularly limited.

FIG. 1 is a schematic view of a hydraulic pressure supply system according to an aspect of the present invention.

Referring to FIG. 1, a hydraulic pressure supply system according to an aspect of the present invention may include may include a mechanical oil pump OP1, an electrical oil pump OP2, a switch valve SW a solenoid valve actuator SOL, and a check valve CV, and hydraulic pressures respectively pumped from the mechanical hydraulic pump OP1 and the electrical hydraulic pump OP2 may be individually supplied to a transmission unit TM or may be joined together in a predetermined pipe and then simultaneously supplied to the transmission unit TM.

The mechanical oil pump OP1 is driven by driving torque of an engine ENG, the electrical oil pump OP2 is driven by an additional electrical motor M, the mechanical oil pump OP1 and the electrical oil pump OP2 are parallel disposed and connected through an oil pan P and an intake path 2.

A filter F is disposed on the intake path 2 to filter an impurity may include in the oil such that filtered oil can be supplied to the mechanical hydraulic pump OP1 and the electrical hydraulic pump OP2.

The switch valve SW is provided as a spool valve and is connected to the first supply path 4 of the mechanical hydraulic pump OP1, and supplies the hydraulic pressure supplied to the first supply path 4 to the second supply path 6 connected with transmission unit TM or to a recirculation path 8.

In addition, the switch valve SW is controlled by the solenoid valve actuator SOL, and when the switch valve SW is turned off by the first solenoid valve actuator SOL, the first supply path 4 is controlled to be connected with the second supply path 6 so as to supply hydraulic pressure supplied from the mechanical hydraulic pump OP1 to the transmission unit TM, and when the switch valve SW is turned on by the solenoid valve actuator SOL, the first supply path 4 may be controlled to be connected with the recirculation path 8 so as to return the hydraulic pressure supplied from the mechanical hydraulic pump OP1 without being supplied to the transmission unit TM.

The electrical oil pump OP2 is connected to the second supply path 6 through a third supply path 10 and the hydraulic pressure discharged from the electrical oil pump OP2 is supplied to the transmission unit TM through the third supply path 10 and the second supply path 6.

In addition, a check valve CV is disposed on the third supply path 10 to block hydraulic pressure flowing backward to the electrical oil pump OP2 from the transmission unit TM side.

The transmission unit TM refers to a torque converter disposed in a downstream side of the pressure control valve and related to transmission of the vehicle, each friction element (clutch, brake, and the like) of a planetary gear train that is directly related with transmission, each lubricating part, and each cooing part.

Figure 2:
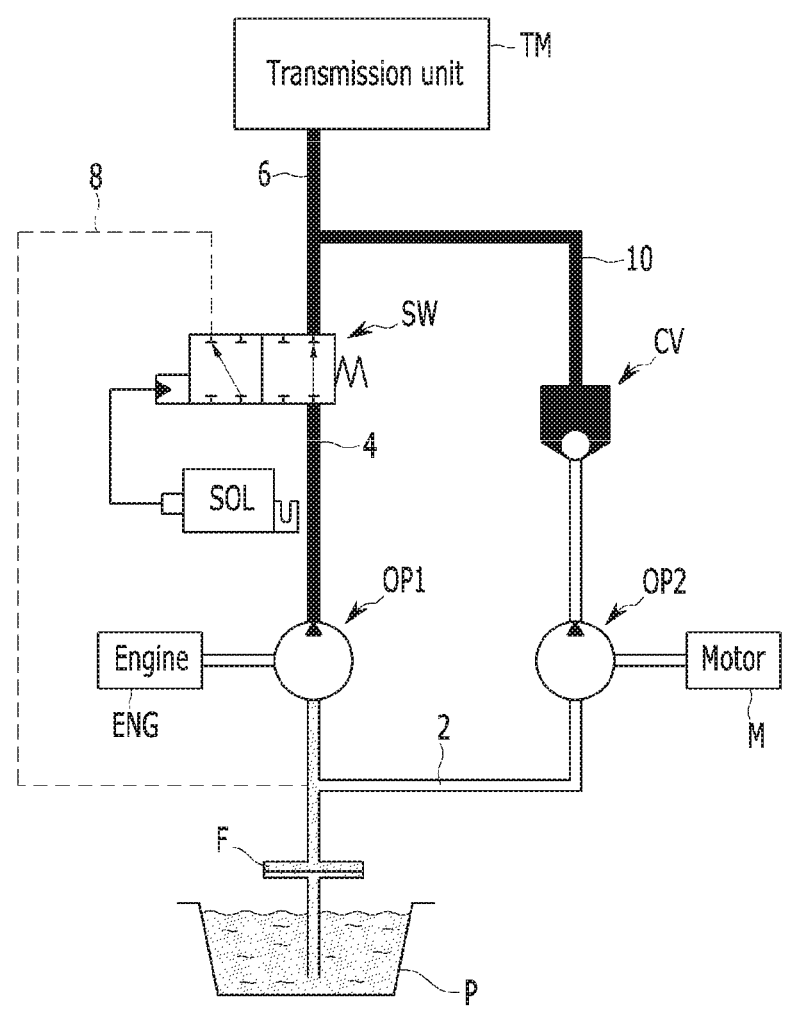
FIG. 2 shows flow of hydraulic pressure in the hydraulic pressure supply system operating in a first operation mode (operation of only mechanical hydraulic pump) according to the exemplary embodiment of the present invention.

FIG. 2 shows flow of hydraulic pressure in the hydraulic pressure supply system operating in a first operation mode (operation of only mechanical hydraulic pump) according to the exemplary embodiment of the present invention.

Referring to FIG. 2, in the first operation mode, hydraulic pressure can be supplied to the transmission unit TM only by driving of the mechanical pump OP1.

The first operation mode is controlled in the condition of an extremely temperature condition (i.e. −40° C. area), a high-pressure request condition, an electric pump malfunction condition, and a low battery residual capacity (SOC) condition. In this case, the electrical motor M driving the electrical oil pump OP2 maintains a state for stopping an operation.

In addition, the mechanical oil pump OP1 is driven while the solenoid valve actuators SOL is turned off, and the hydraulic pressure pumped in the mechanical hydraulic pump OP1 is supplied to the transmission unit TM through the first supply path 4, the switch valve SW, and the second supply path 6, in the same way as the conventional automatic transmission.

Figure 3:
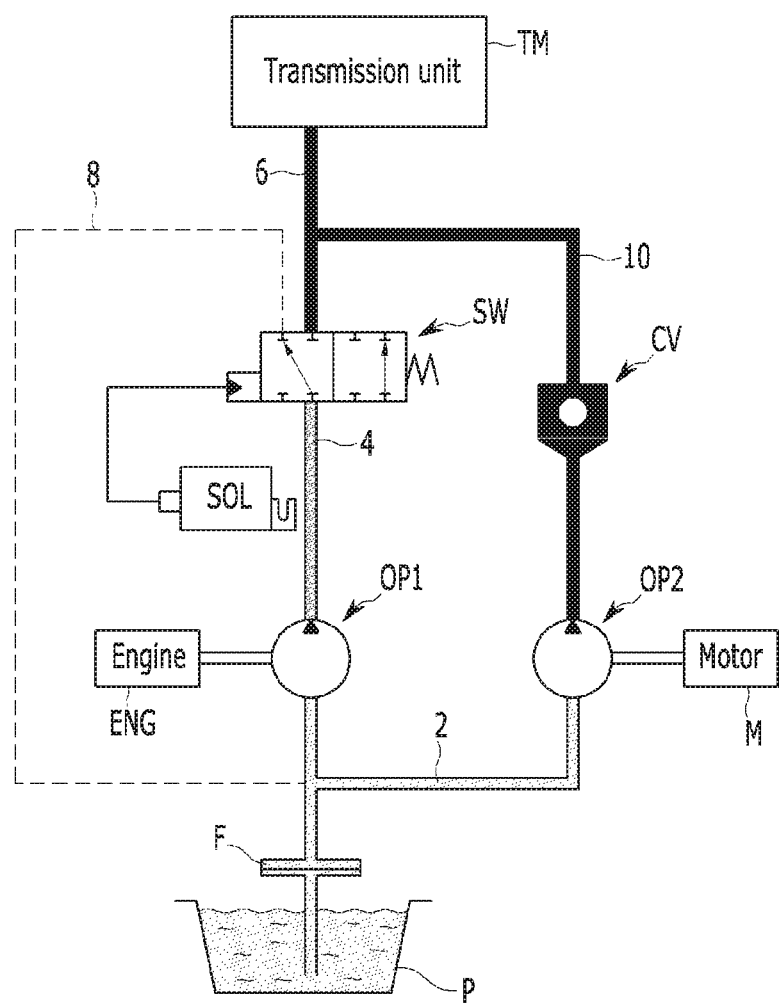
FIG. 3 shows flow of hydraulic pressure in the hydraulic pressure supply system operation in a second operation mode (operation of only electrical hydraulic pump) according to the exemplary embodiment of the present invention.

FIG. 3 shows flow of hydraulic pressure in the hydraulic pressure supply system operation in a second operation mode (operation of only electrical hydraulic pump) according to the exemplary embodiment of the present invention.

Referring to FIG. 3, in the second operation mode, hydraulic pressure can be supplied to the transmission unit TM only by driving of the electrical pump OP2.

The second operation mode is controlled a main operating area (i.e., fuel consumption area, oil temperature of 20° C. to 100° C.), a low pressure under middle load condition, and in an idle stop condition (i.e., engine stop) for an idle stop and go (ISG) function, only the electrical hydraulic pump OP2 is driven and the hydraulic pressure pumped from the electrical hydraulic pump OP2 is supplied to the transmission unit TM through the third supply path 10 and the second supply path 6.

In addition, the switch valve SW connects the first supply path 4 and the recirculation path 8 by turning on of the solenoid valve actuator SOL, the hydraulic pressure pumped from the mechanical oil pump OP1 is returned through the mechanical oil pump OP1.

In this case, although the mechanical hydraulic pump OP1 is driven, hydraulic pressure is returned through the recirculation path 28 without resistance such that a driving loss of the mechanical hydraulic pump OP1 is very low.

In such a second operation mode, rotation speed of the electrical oil pump OP2 is actively controlled (i.e., on-demand control) according to the above-stated driving condition such that optimal fuel consumption efficiency can be acquired.

Figure 4:
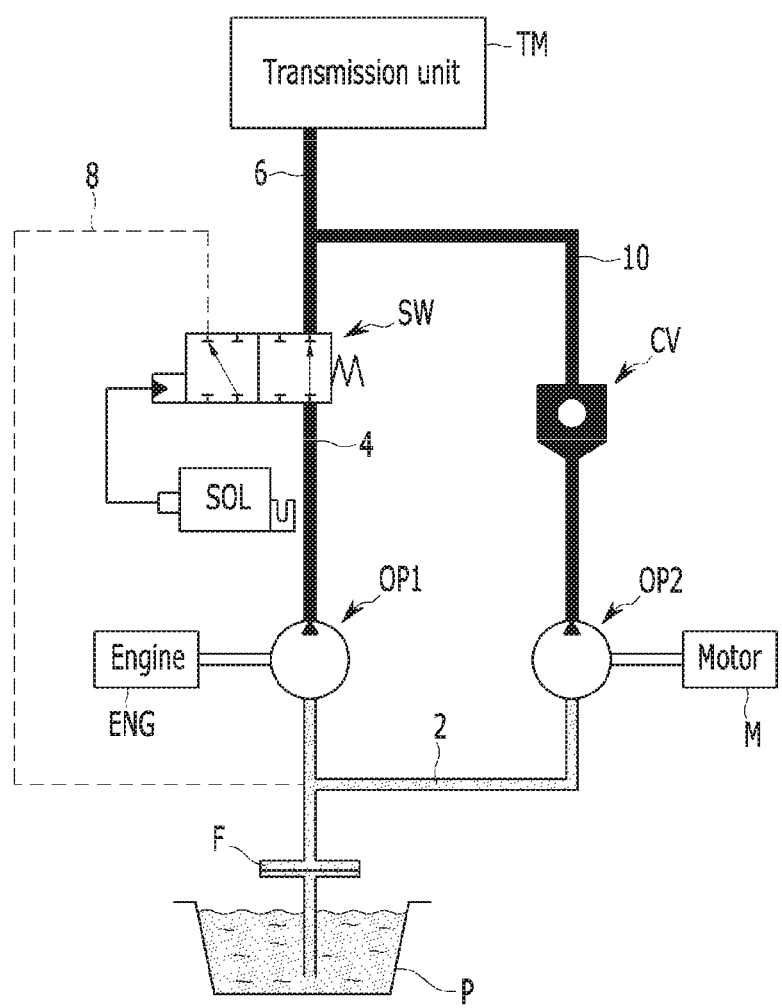
FIG. 4 shows flow of hydraulic pressure in the hydraulic pressure supply system operation in a third operation mode (simultaneous operation of mechanical pump and operation of electrical hydraulic pump) according to the exemplary embodiment of the present invention.

FIG. 4 shows flow of hydraulic pressure in the hydraulic pressure supply system operation in a second operation mode (simultaneous operation of mechanical pump and operation of electrical hydraulic pump) according to the exemplary embodiment of the present invention.

Referring to FIG. 4, in the third operation mode, hydraulic pressure can be supplied to the transmission unit TM by simultaneous operation of the mechanical pump OP1 and the electrical oil pump OP2.

The third operation mode is controlled a high temperature condition (i.e., 100° C. to 140° C.) and a high flow rate request condition (i.e., high load/at the time of shift), hydraulic pressure pumped from the mechanical oil pump OP1 and the electrical hydraulic pump OP2 is joined at the second supply path 6 and then supplied to the transmission unit TM.

In such the second operation mode, capacity of the electrical oil pump OP21 is assisted minimized capacity of the mechanical oil pump OP1 such that a problem of hydraulic pressure performance is not occurred.

As described above, the hydraulic supply system according to the exemplary embodiment of the present invention realizes three pump operation modes according to driving condition such that reduction of fuel consumption can be effectively optimized.

In addition, capacity of the mechanical oil pump served as an auxiliary pump of the electrical hydraulic pump is minimized to thereby reduce a volumetric rate and heaviness of the vehicle.

Further, stability of hydraulic pressure can be acquired by optimum-driving only using the electrical hydraulic pump in the main driving area.

Further, since a fail-safe function is provided, system reliability can be improved even through the electrical hydraulic pump malfunctions.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention may have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle, generating high-pressure hydraulic pressure from oil stored in an oil pan and supplying the hydraulic pressure to a transmission unit, including:
    a mechanical oil pump driven by an engine to pump the oil stored in the oil pan as a first high-pressure hydraulic pressure and to supply the oil stored in the oil pan to a first supply path fluidly-connected to the mechanical oil pump;
    a switch valve fluidly-connected to the first supply path and selectively supplying oil supplied from the first supply path to the transmission unit through a second supply path fluidly-connected to the switch valve and the transmission unit,
    a solenoid valve actuator engaged to the switch valve and configured to be turned on/off to control the switch valve; and
    an electrical oil pump fluidly connected to the oil pan and engaged to and driven by an electrical motor to pump the oil stored in the oil pan as a second high-pressure hydraulic pressure and supply oil in the electrical oil pump to a third supply path fluidly-connected with the second supply path,
    wherein the first and second hydraulic pressures are applied to the transmission unit through three operation modes.

2. The hydraulic pressure supply system of claim 1, wherein a recirculation path is fluidly-connected to the switch valve, the oil pan, the mechanical oil pump, and the electrical oil pump.

3. The hydraulic pressure supply system of claim 2, wherein the switch valve is provided as a spool valve, and is fluidly-connected to the first supply path of the mechanical oil pump and selectively supplies oil supplied to the first supply path to the second supply path and the recirculation path depending on a turn-on or turn-off state of the solenoid valve actuator.

4. The hydraulic pressure supply system of claim 1, wherein a check valve preventing back flow is provided on the third supply path.

5. The hydraulic pressure supply system of claim 1, wherein the three operation modes include:
    a first operation mode in which only the first hydraulic pressure of the mechanical oil pump is applied to the transmission unit;
    a second operation mode in which only the second hydraulic pressure of the electrical oil pump is applied to the transmission unit; and
    a third operation mode in which the first and second hydraulic pressures of the mechanical oil pump and the electrical oil pump are supplied to the transmission unit.

* * * * *